(12) United States Patent
Sumitomo

(10) Patent No.: US 8,581,564 B2
(45) Date of Patent: Nov. 12, 2013

(54) SWITCHING POWER SUPPLY APPARATUS

(75) Inventor: Hironori Sumitomo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 13/568,650

(22) Filed: Aug. 7, 2012

(65) Prior Publication Data

US 2013/0038308 A1 Feb. 14, 2013

(30) Foreign Application Priority Data

Aug. 8, 2011 (JP) ................................. 2011-172688

(51) Int. Cl.
*G05F 1/40* (2006.01)
(52) U.S. Cl.
USPC ........................................................ 323/282
(58) Field of Classification Search
USPC ............................ 323/265, 271, 282, 283, 351
See application file for complete search history.

(56) References Cited

U.S. PATENT DOCUMENTS

| | | | |
|---|---|---|---|
| 6,278,265 B1 * | 8/2001 | Yokosawa | 323/282 |
| 7,019,504 B2 * | 3/2006 | Pullen et al. | 323/283 |
| 7,482,791 B2 * | 1/2009 | Stoichita et al. | 323/271 |
| 7,482,793 B2 * | 1/2009 | Stoichita | 323/282 |
| 8,040,121 B2 * | 10/2011 | Ishida et al. | 323/285 |
| 2011/0291626 A1 * | 12/2011 | Murakami | 323/271 |

FOREIGN PATENT DOCUMENTS

JP 2010-035316 12/2010

* cited by examiner

*Primary Examiner* — Adolf Berhane
(74) *Attorney, Agent, or Firm* — Fish & Richardson P.C.

(57) ABSTRACT

A switching power supply apparatus includes: an output transistor to generate an output voltage from an input voltage based on an ON/OFF control of the output transistor; a reference voltage generating unit to generate a reference voltage; a ripple injection unit to inject a ripple component into the reference voltage to generate a ripple reference voltage; a comparator to compare a feedback voltage with the ripple reference voltage to generate a comparison signal; and a switching controller to perform the ON/OFF control of the output transistor based on the comparison signal.

10 Claims, 11 Drawing Sheets

SWITCHING POWER SUPPLY APPARATUS

CROSS-REFERENCE TO RELATED APPLICATION

This application is based upon and claims the benefit of priority from Japanese Patent Application No. 2011-172688, filed on Aug. 8, 2011, the entire contents of which are incorporated herein by reference.

TECHNICAL FIELD

The present disclosure relates to a switching power supply apparatus using nonlinear control.

BACKGROUND

A switching power supply apparatus using nonlinear control (for example, hysteresis window control, fixed on-time with bottom detection control, fixed off-time with upper detection control or the like) can obtain a high load response characteristic with a simple circuit configuration as compared to a switching power supply apparatus using linear control (for example, voltage mode control, current mode control or the like).

Such a switching power supply apparatus using nonlinear control may be configured to use an output ripple voltage (a ripple component of an output voltage) to drive a comparator and perform a switching control of an output transistor. The output ripple voltage is required to have a relatively large amplitude (wave height) in order to detect the output ripple voltage accurately. Therefore, an output capacitor having a relatively large equivalent series resistance (ESR) (for example, a conductive polymer type capacitor) needs to be used in the switching power supply apparatus, which may lead to limited part selection and increased cost.

In the related art, there is known a technique (a ripple injection technique), in which a ripple component is injected into (superimposed on) a reference voltage REF or a feedback voltage FB which are input to a comparator in a forced manner to stably drive the comparator.

FIG. 10 is a circuit diagram showing an example of a conventional switching power supply apparatus employing such ripple injection technique. The conventional switching power supply apparatus employs a method of injecting a ripple component into a feedback voltage FB via a resistor-capacitor (RC) circuit using a square wave-shaped switch voltage SW (hereinafter referred to as a RC injection method). If this ripple injection technique is employed, stable switching control may be implemented even if the amplitude of an output ripple voltage is not very large, which makes it possible to use a stacked ceramic capacitor of a small ESR as an output capacitor.

However, in a switching power supply apparatus employing the RC injection method, since the ripple component superimposed on the feedback voltage FB has a waveform obtained by smoothing a square wave-shaped switch voltage SW, there are problems in that (1) an amplitude (wave height) of the ripple component is varied depending on an ON time of the switch voltage SW (see FIG. 11), and (2) linearity of the ripple component is damaged depending on the ON time of the switch voltage SW (see the dashed line in FIG. 11).

In addition, in the switching power supply apparatus employing the RC injection method, since a ripple current component of an inductor is not included in the ripple component superimposed on the feedback voltage FB, there is another problem in that (3) ringing of an output voltage OUT is likely to appear due to insufficient stability in the event of a sudden change in a load (see FIG. 12).

SUMMARY

The present disclosure provides some embodiments of a switching power supply apparatus using nonlinear control, which is capable of providing a stable switching control using a ripple injection.

According to one embodiment of the present disclosure, there is provided a switching power supply apparatus including: an output transistor configured to generate an output voltage from an input voltage based on an ON/OFF control of the output transistor; a reference voltage generating unit configured to generate a reference voltage; a ripple injection unit configured to inject a ripple component into the reference voltage to generate a ripple reference voltage; a comparator configured to compare a feedback voltage based on the output voltage with the ripple reference voltage to generate a comparison signal; and a switching controller configured to perform the ON/OFF control of the output transistor based on the comparison signal, wherein the ripple injection unit includes: a charging/discharging portion configured to generate a charge/discharge current based on the ON/OFF control of the output transistor; a capacitor which is charged/discharged by the charge/discharge current; and a gm amplifier configured to bias one end of the capacitor by using the reference voltage; and wherein the ripple reference voltage is output from the one end of the capacitor.

In some embodiments, the gm amplifier is configured to be irresponsive to a variation of an output having a period shorter than an ON period of the output transistor.

In some embodiments, the ripple injection unit further includes an error amplifier configured to amplify a difference between the reference voltage and the feedback voltage to generate an error voltage, and the gm amplifier is configured to bias the one end of the capacitor using the error voltage.

In some embodiments, the charging/discharging portion includes: a first current source configured to generate a first current based on the output voltage; a second current source configured to generate a second current based on the input voltage, the second current being larger than the first current; and a switch configured to open/close a current path of the second current based on the ON/OFF control of the output transistor, wherein the switch is off during a charging period of the capacitor such that the first current flows into the capacitor, and the switch is on during a discharging period of the capacitor such that a differential current between the first current and the second current flows out of the capacitor.

In some embodiments, the switching controller includes: a D flip-flop having a clock input terminal to which the comparison signal is input; a driver configured to perform the ON/OFF control of the output transistor based on an output signal of the D flip-flop; and an ON time setting unit configured to generate a reset signal of the D flip-flop to set an ON time of the output transistor.

In some embodiments, the ON time setting unit shortens the ON time of the output transistor with an increase in the input voltage, while lengthening the ON time of the output transistor with a decrease in the input voltage.

In some embodiments, the ON time setting unit shortens the ON time of the output transistor with an increase of the input voltage, while lengthening the ON time of the output transistor with a decrease of the input voltage.

In some embodiments, the ON time setting unit includes: a triangular wave voltage generating circuit configured to generate a triangular wave voltage based on the input voltage; a division output voltage generating circuit configured to generate a division output voltage based on the output voltage; and a second comparator configured to compare the triangular wave voltage with the division output voltage to generate the reset signal.

In some embodiments, the triangular wave voltage generating circuit includes: a voltage/current converting portion configured to generate a charge current based on the input voltage; a second capacitor connected to the voltage/current converting portion; and a second switch configured to perform switching between charging and discharging of the second capacitor based on the ON/OFF control of the output transistor.

DETAILED DESCRIPTION

<General Configuration>

Figure 1:
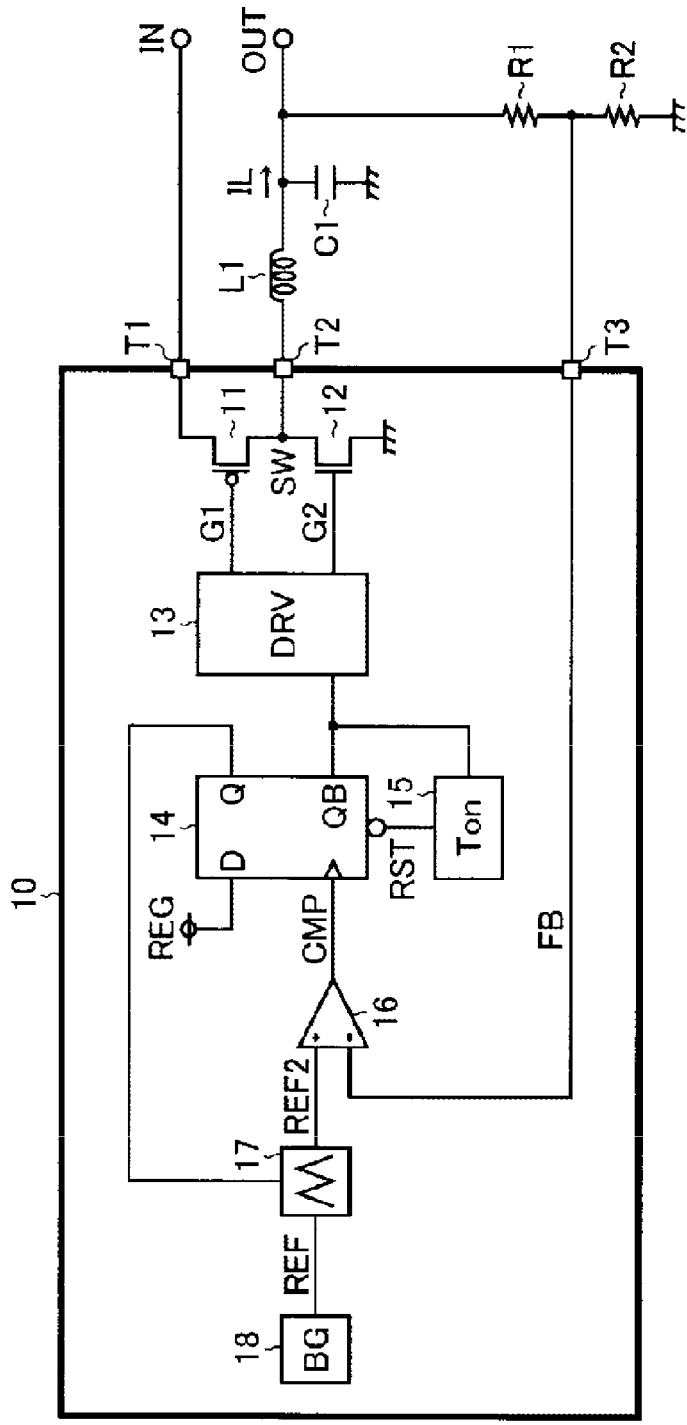
FIG. 1 is a circuit diagram showing an illustrative embodiment of a switching power supply apparatus.

FIG. 1 is a circuit diagram showing an illustrative embodiment of a switching power supply apparatus. A switching power supply apparatus 1 of the embodiment may be a step down DC/DC converter, which generates an output voltage OUT from an input voltage IN in a nonlinear control manner (e.g., a fixed on-time with bottom detection control manner). The switching power supply apparatus 1 includes a semiconductor device 10, and a variety of discrete parts (an inductor L1, a capacitor C1, resistors R1 and R2), which are attached to the semiconductor device 10.

The semiconductor device 10 includes, at least, external terminals T1 to T3 to establish an electrical connection to the outside. Outside the semiconductor device 10, the external terminal (a power terminal) T1 is connected to an input end of the input voltage IN. The external terminal (a switch terminal) T2 is connected to a first end of the inductor L1. A second end of the inductor L1, a first end of the capacitor C1 and a first end of the resistor R1 are all connected to an input end of the output voltage OUT. A second end of the capacitor C1 is connected to a ground terminal. A second end of the resistor R1 and a first end of the resistor R2 are both connected to the external terminal (a feedback terminal) T3. A second end of the resistor R2 is connected to the ground terminal. The resistors R1 and R2 function as a feedback voltage generator which outputs a feedback voltage FB. The feedback voltage FB is obtained by dividing the output voltage OUT at a connection node between the resistor R1 and the resistor R2. The inductor L1 and the capacitor C1 operate as an output smoothing unit to smooth a square wave-shaped switch voltage SW appearing at the external terminal T2 to generate the output voltage OUT.

The semiconductor device 10 may be a switching power supply integrated circuit (IC) in which a P-channel type metal oxide semiconductor (MOS) field effect transistor 11, an N-channel type MOS field effect transistor 12, a driver 13, a D flip-flop 14, an ON time setting unit 15, a comparator 16, a ripple injection unit 17 and a reference voltage generator 18 are integrated.

The transistor 11 is an output transistor, which is connected between the external terminal T1 and the external terminal T2, and performs an ON/OFF control based on a gate signal G1 input from the driver 13. Specifically, in terms of the relationship, a source of the transistor 11 is connected to the external terminal T and a drain of the transistor 11 is connected to the external terminal T2. A gate of the transistor 11 is connected to an input end of the gate signal G1.

The transistor 12 is a synchronous rectification transistor, which is connected between the external terminal T2 and the ground terminal, and performs an ON/OFF control based on a gate signal G2 input from the driver 13. Specifically, a drain of the transistor 12 is connected to the external terminal T2 and a source of the transistor 12 is connected to the ground terminal. A gate of the transistor 12 is connected to an input end of the gate signal G2. Alternatively, a diode may be used as a rectification element instead of the transistor 12.

The driver 13 generates the gates signals G1 and G2 based on an inverted output signal QB of the D flip-flop 14 to perform switching control of the transistors 11 and 12 complementarily (or exclusively). As used herein, the term "complementarily (or exclusively)" includes not only a case in which the ON/OFF of the transistors 11 and 12 are completely contrary to each other but also a case in which a predetermined delay is incurred to an ON/OFF transition timing of the transistors 11 and 12 from a standpoint of preventing a through current (a case in which a simultaneous OFF period is provided). The square wave-shaped switch voltage SW is generated at the external terminal T2 by the ON/OFF operation of the transistors 11 and 12.

Figure 2:
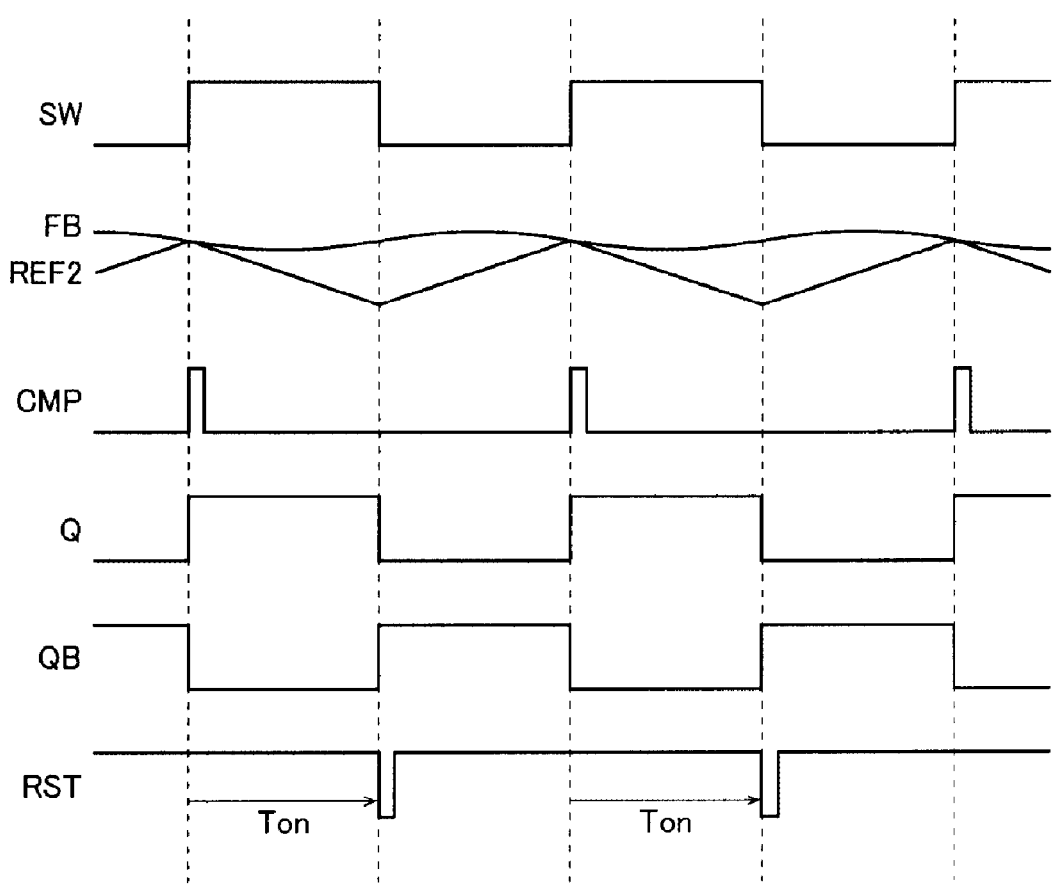
FIG. 2 is a timing diagram showing an example of a switching operation of the switching power supply apparatus.

The D flip-flop 14 sets an output signal Q to a high level (an internal power voltage REG applied to a data input terminal D) at a rising edge of a comparison signal CMP input from the comparator 16 and resets the output signal Q to a low level at a falling edge of a reset signal RST input from the ON time setting unit 15 (see FIG. 2).

After an inverted output signal QB of the D flip-flop 14 falls to a low level and a predetermined ON time Ton has elapsed, the ON time setting unit 15 generates a trigger pulse of a low level for the reset signal RST (see FIG. 2). The configuration and operation of the ON time setting unit 15 will be described in more detail later.

The driver 13, the D flip-flop 14 and the ON time setting unit 15 function as a switching controller that performs an ON/OFF control of the transistors 11 and 12 based on the comparison signal CMP output from the comparator 16.

The comparator 16 compares the feedback voltage FB (a division voltage of the output voltage OUT) input from the external terminal T3 (the connection node between the resistor R1 and the resistor R2) to an inverted input terminal (−) with a ripple reference voltage REF2 input from the ripple injection unit 17 to a non-inverted input terminal (+), thereby outputting the comparison signal CMP based on a result of the comparison. If the feedback voltage FB is higher than the ripple reference voltage REF2, then the comparison signal CMP turns to a low level, and if the feedback voltage FB is equal to or lower than the ripple reference voltage REF2, then the comparison signal CMP turns to a high level (see FIG. 2).

The ripple injection unit 17 injects a ripple component into the reference voltage REF input from the reference voltage generator 18 to generate the ripple reference voltage REF2 (see FIG. 2). The configuration and operation of the ripple injection unit 17 will be described in more detail later.

The reference voltage generator 18 uses a band gap circuit or the like to generate a constant reference voltage REF which is independent of a variation of the input voltage IN and the ambient temperature.

<Ripple Injection Unit>

<First Configuration Example>

Figure 3:
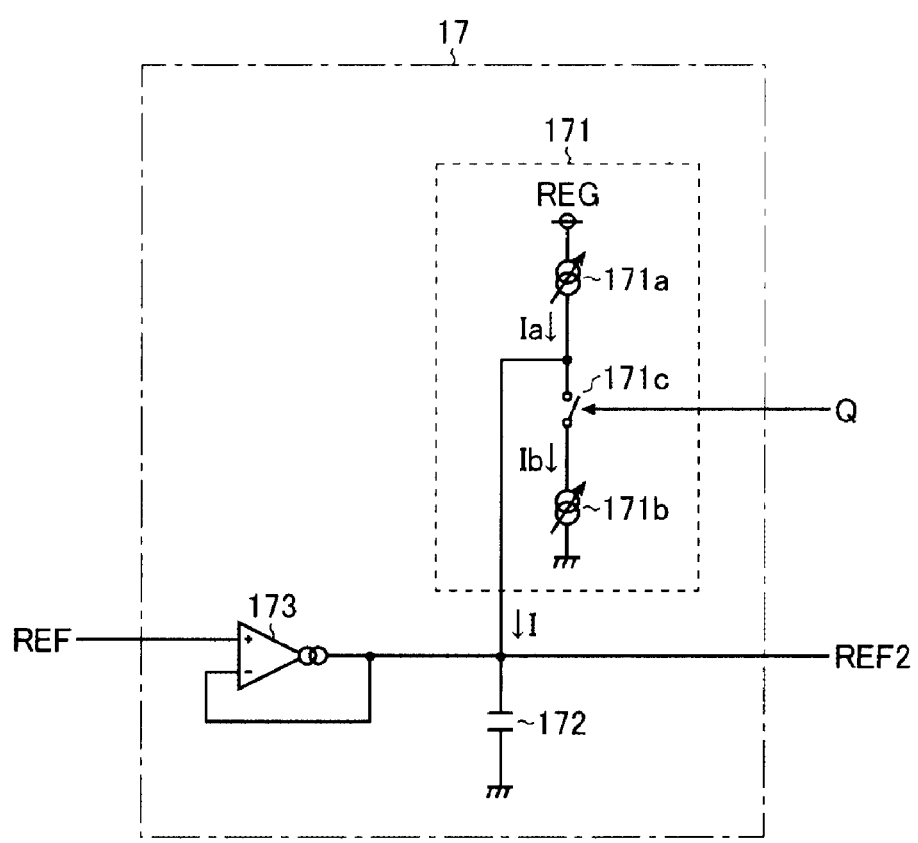
FIG. 3 is a circuit diagram showing a first configuration example of a ripple injection unit shown in FIG. 1.

FIG. 3 is a circuit diagram showing a first configuration example of the ripple injection unit 17. The ripple injection unit 17 of the first configuration example includes a charging/discharging portion 171, a capacitor 172 and a gm amplifier 173.

The charging/discharging portion 171 includes current sources 171a and 171b and a switch 171c, and generates a charge/discharge current I based on the output signal Q of the D flip-flop 14 (and an ON/OFF control of the output transistor 11 and the synchronous rectification transistor 12).

The current source 171a is connected between an input end of the internal power voltage REG and a first end of the capacitor 172 to generate a current Ia that is proportional to the output voltage OUT.

The current source 171b is connected between the first end of the capacitor 172 and the ground terminal to generate a current Ib that is proportional to the input voltage IN.

The current sources 171a and 171b are so designed that the current Ib is always larger than the current Ia without depending on the input voltage IN and the output voltage OUT.

The switch 171c is connected between the first end of the capacitor 172 and the current source 171b, to thereby open/close a current path of the current Ib based on the output signal Q of the D flip-flop 14 (and an ON/OFF control of the output transistor 11 and the synchronous rectification transistor 12).

The capacitor 172 is connected between an output end of the ripple reference voltage REF2 and the ground terminal and is charged/discharged using the charge/discharge current I. A charge voltage appearing at the first end of the capacitor 172 is output, as the ripple reference voltage REF2, to the comparator 16.

The gm amplifier (transconductance amplifier) 173 is biased to the first end of the capacitor 172 such that the reference voltage REF applied to a non-inverted input terminal (+) matches with the ripple reference voltage REF2 applied to an inverted input terminal (−). By this configuration, a DC level (REF2DC) of the ripple reference voltage REF2 may be matched with the reference voltage REF. Accordingly, the ripple reference voltage REF2 has a waveform whose voltage value is varied based on a charged/discharged state of the capacitor 172 with the reference voltage REF as a midpoint voltage (see FIG. 4).

The gm amplifier 173 may be so designed that it does not respond to a variation of an output which has a shorter period than an ON time Ton of the output transistor 11. This configuration makes it possible to determine a bias point of the ripple reference voltage REF2 without having any influence on the injection (superimposition) of a ripple component.

Although it is illustrated in FIG. 3 that the inverted input terminal (−) and the output terminal of the gm amplifier 173 are directly connected to each other (i.e., the gm amplifier 173 functions as a buffer), the present disclosure is not limited thereto. For example, a division voltage (REF2/α) of the ripple reference voltage REF2 may be fed back to the inverted input terminal (−) of the gm amplifier 173. In this case, the DC level of the ripple reference voltage REF2 becomes REF×α.

Figure 4:
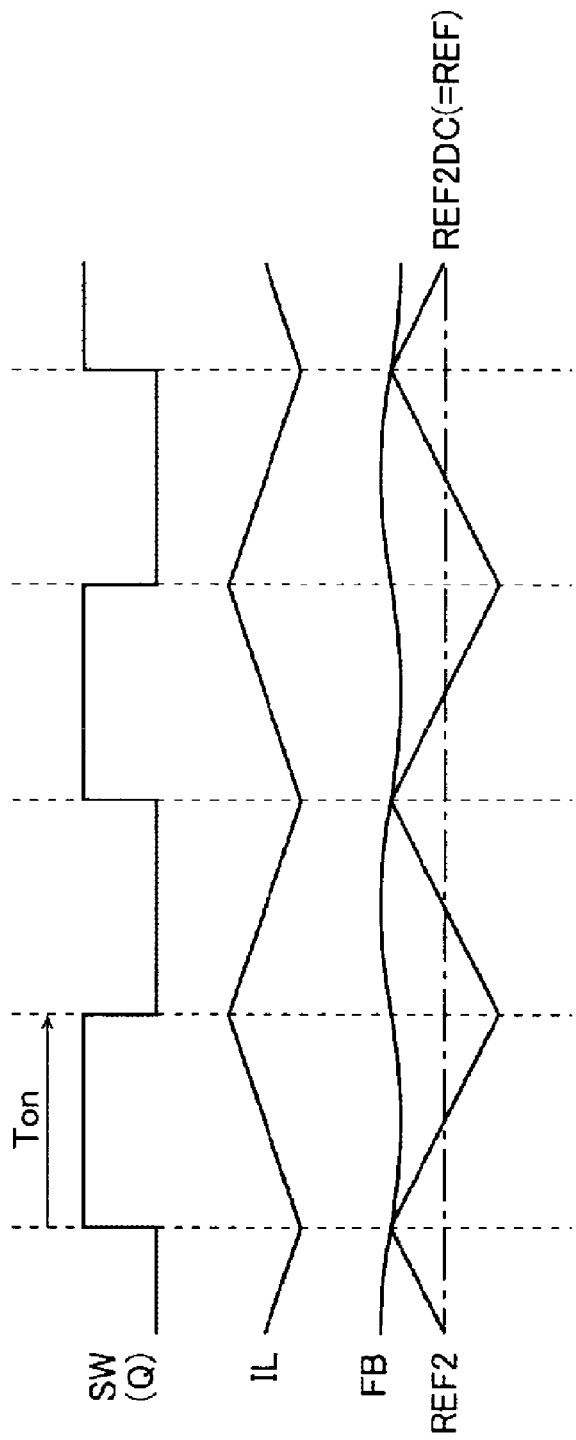
FIG. 4 is a timing diagram showing a ripple injection operation of the first configuration example.

FIG. 4 is a timing diagram showing a ripple injection operation of the first configuration example. From the top, the switch voltage SW (the same logic level with the output signal Q), the inductor current IL, the feedback voltage FB and the ripple reference voltage REF2 are depicted in this order.

A low level period of the switch voltage SW (the output signal Q) corresponds to an OFF period of the output transistor 11 (an ON period of the synchronous rectification transistor 12), and the inductor current IL based on the output voltage OUT flows through the inductor L1 from the ground terminal toward the input end of the output voltage OUT. In order to generate a ripple component reflecting this inductor current IL, the charging/discharging portion 171 charges the capacitor 172 using the charge/discharge current I (Ia) based on the output voltage OUT. In more detail, the switch 171c is switched off during a charging period of the capacitor 172, so that the current Ia based on the output voltage OUT flows, as the charge/discharge current I, into the capacitor 172.

On the other hand, a high level period of the switch voltage SW (the output signal Q) corresponds to an ON period of the output transistor 11 (an OFF period of the synchronous rectification transistor 12), and the inductor current IL based on a differential voltage (IN−OUT) between the input voltage IN and the output voltage OUT flows through the inductor L1 from the input end of the input voltage IN toward the input end of the output voltage OUT. In order to generate a ripple component reflecting this inductor current IL, the charging/discharging portion 171 discharges the capacitor 172 using the charge/discharge current I (Ib−Ia) based on the differential voltage (IN−OUT) between the input voltage IN and the output voltage OUT. In more detail, the switch 171c is switched on during a discharging period of the capacitor 172, so that a differential current (Ib−Ia) between the current Ia and the current Ib flows, as the charge/discharge current I, out of the capacitor 172.

In this way, the ripple injection unit 17 employing the first configuration example may provide linearity to the ripple component injected into (superimposed on) the reference voltage REF without relying on a duty of the switch voltage SW, which may result in a high stability of switching control.

<Second Configuration Example>

Figure 5:
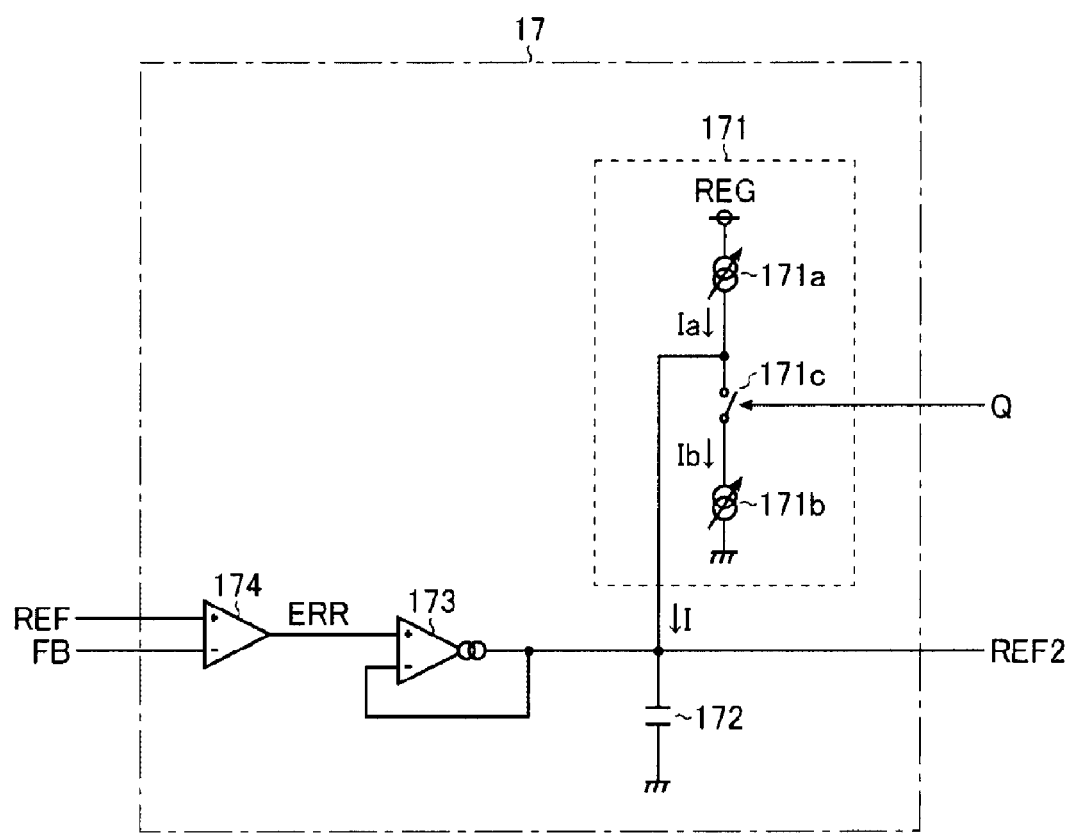
FIG. 5 is a circuit diagram showing a second configuration example of the ripple injection unit.

FIG. 5 is a circuit diagram showing a second configuration example of the ripple injection unit 17. The second embodiment is almost identically configured as the first configuration example and is characterized in that an error amplifier 174 is added. Therefore, the same elements as in the first configuration example are denoted by the same reference numerals as in FIG. 3 and repetitive descriptions will be omitted, and the following description will be focused on characteristic portions of the second configuration example.

The error amplifier 174 is provided in a stage previous to the gm amplifier 173 and amplifies a difference between the reference voltage REF input to a non-inverted input terminal (+) and the feedback voltage FB input to an inverted input terminal (−) to generate an error voltage ERR. The error amplifier 174 may be of either a voltage output type or a current output type.

Figure 6:
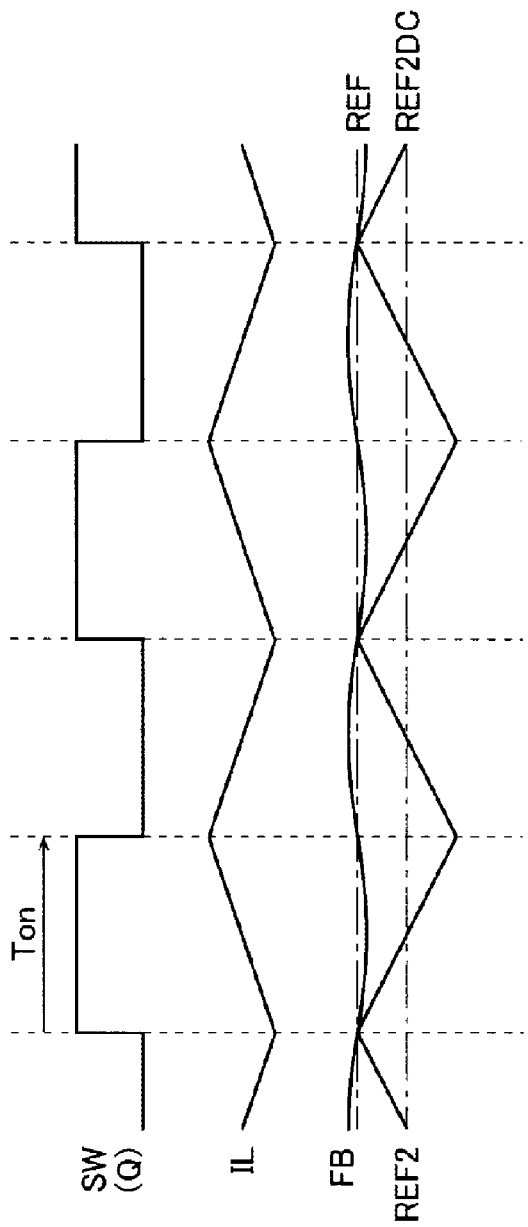
FIG. 6 is a timing diagram showing a ripple injection operation of the second configuration example.
Figure 7:
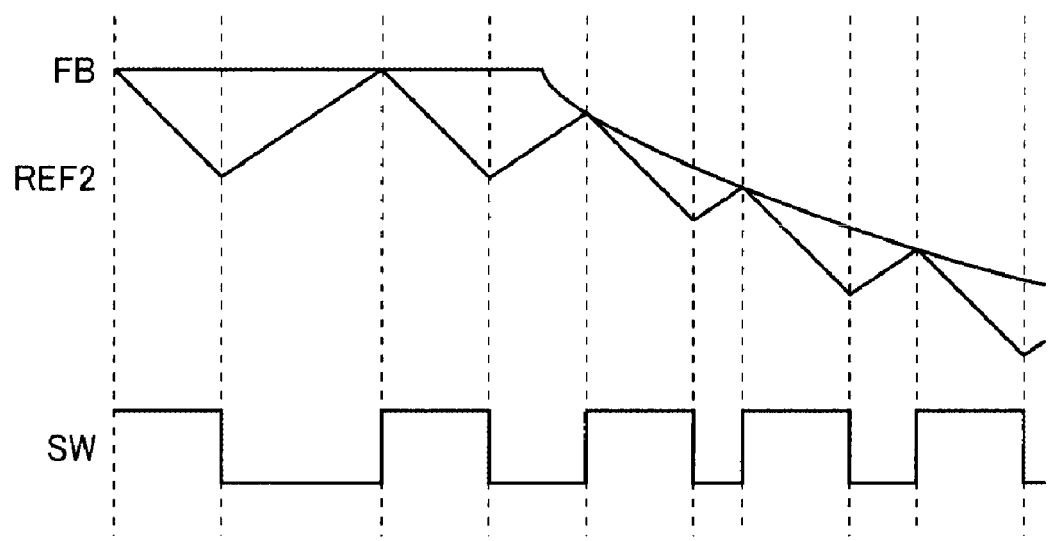
FIG. 7 is a timing diagram showing a response in the event of a sudden change in a load.

The gm amplifier 173 biases the first end of the capacitor 172 such that the error voltage ERR applied to the non-inverted input terminal (+) matches with the ripple reference voltage REF2 applied to the inverted input terminal (−) of the gm amplifier 173. With this configuration, the DC level REF2DC of the ripple reference voltage REF2 may be matched with the error voltage ERR. Also, in this case, the DC level REF2DC of the ripple reference voltage REF2 is feedback controlled to make the reference voltage REF match with the feedback voltage FB. Accordingly, the ripple reference voltage REF2 has a waveform whose voltage value varies depending on a charge/discharge state of the capacitor 172 with the reference voltage REF as an upper limit voltage (see FIG. 6).

In this way, the ripple injection unit 17 employing the second configuration example can provide the same effects as the first configuration example and cancel an offset (mismatch of the DC level) of the ripple reference voltage REF2 due to an error between the current Ia and the current Ib.

In addition, even if the feedback voltage FB suddenly decreases due to a sudden change in a load, the ripple injection unit 17 employing the second configuration example may generate the ripple reference voltage REF2 such that the duty of the switch voltage SW is automatically increased in response to the decrease of the feedback voltage FB, which results in high operation stability in the event of the sudden change in the load and suppression of the ringing of the output voltage OUT.

<Charging/Discharging Portion>

Figure 8:
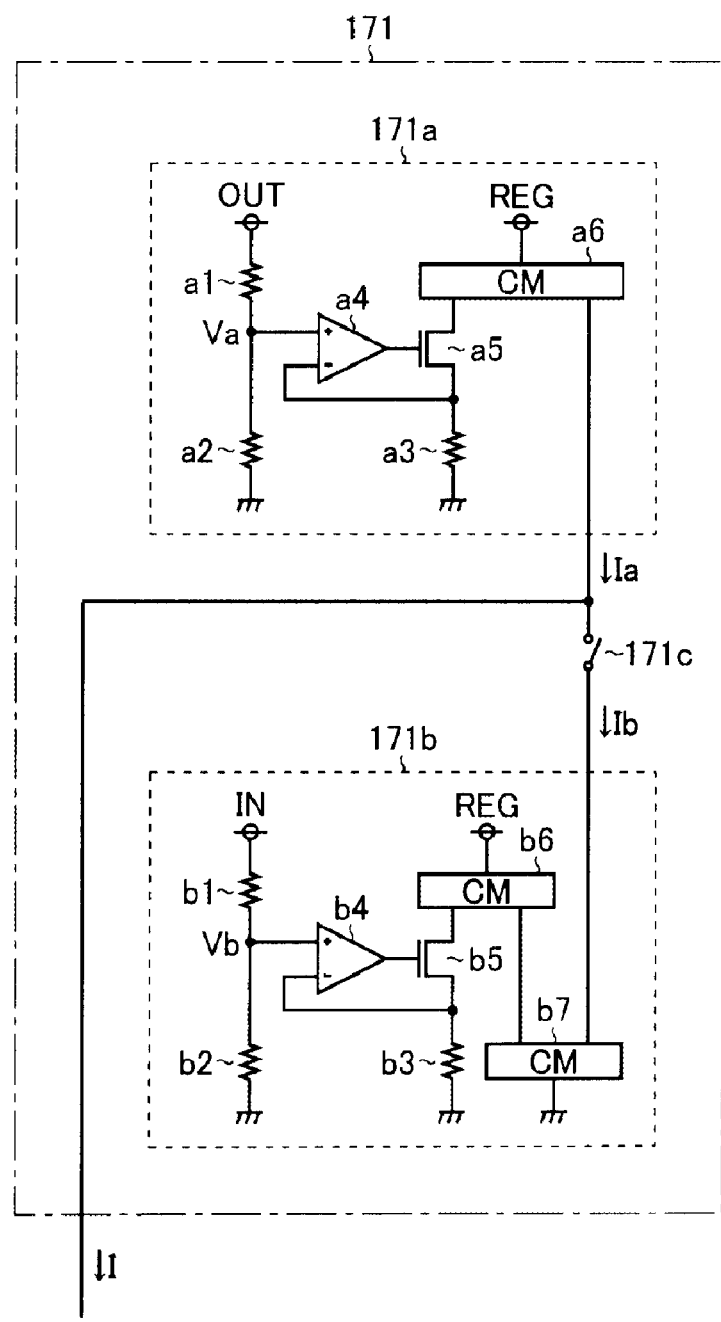
FIG. 8 is a circuit diagram showing a configuration example of current sources shown in FIG. 3.

FIG. 8 is a circuit diagram showing a configuration example of the current sources 171a and 171b included in the charging/discharging portion 171.

The current source 171a includes resistors a1 to a3, an operational (OP) amplifier a4, an N-channel type MOS field effect transistor (MOSFET) a5 and a current mirror a6. A first end of the resistor a1 is connected to an input end of the output voltage OUT. A second end of the resistor a1 and a first end of the resistor a2 are connected to a non-inverted input terminal (+) of the OP amplifier a4. A second end of the resistor a2 is connected to the ground terminal. An inverted input terminal (−) of the OP amplifier a4 is connected to a first end of the resistor a3. A second end of the resistor a3 is connected to the ground terminal. An output terminal of the OP amplifier a4 is connected to a gate of the transistor a5. A source of the transistor a5 is connected to the first end of the resistor a3 and a drain of the transistor a5 is connected to an input terminal of the current mirror a6. An output terminal of the current mirror a6 is connected to a first end of the switch 171c.

With the current source 171a as configured above, a division voltage Va of the output voltage OUT is generated at a connection node between the resistors a1 and a2. The OP amplifier a4 controls a conductance of the transistor a5 such that a voltage applied to the first end of the resistor a3 matches with the division voltage Va. Accordingly, a current (Va/Ra) determined by the resistance Ra of the resistor a3 and the division voltage Va flows through the resistor a3. This current is mirrored through the current mirror a6 and is outputted from the current source 171a as the current Ia.

The current source 171b includes resistors b1 to b3, an OP amplifier b4, an N-channel type MOS field effect transistor (MOSFET) b5 and current mirrors b6 and b7. A first end of the resistor b1 is connected to an input end of the input voltage IN. A second end of the resistor b2 and a first end of the resistor b2 are connected to a non-inverted input terminal (+) of the OP amplifier b4. A second end of the resistor b2 is connected to the ground terminal. An inverted input terminal (−) of the OP amplifier b4 is connected to a first end of the resistor b3. A second end of the resistor b3 is connected to the ground terminal. An output terminal of the OP amplifier b4 is connected to a gate of the transistor b5. A source of the transistor b5 is connected to the first end of the resistor b3 and a drain of the transistor b5 is connected to an input terminal of the current mirror b6. An output terminal of the current mirror b6 is connected to an input terminal of the current mirror b7. An output terminal of the current mirror a7 is connected to a second end of the switch 171c.

With the current source 171b as configured above, a division voltage Vb of the input voltage IN is generated at a connection node between the resistors b1 and b2. The OP amplifier b4 controls a conductance of the transistor b5 such that a voltage applied to the first end of the resistor b3 matches with the division voltage Vb. Accordingly, a current (Vb/Rb) determined by a resistance Rb of the resistor b3 and the division voltage Vb flows through the resistor b3. This current is mirrored through the current mirrors b6 and b7 and is outputted from the current source 171b as the current Ib.

<On-Time Setting Part>

Figure 9:
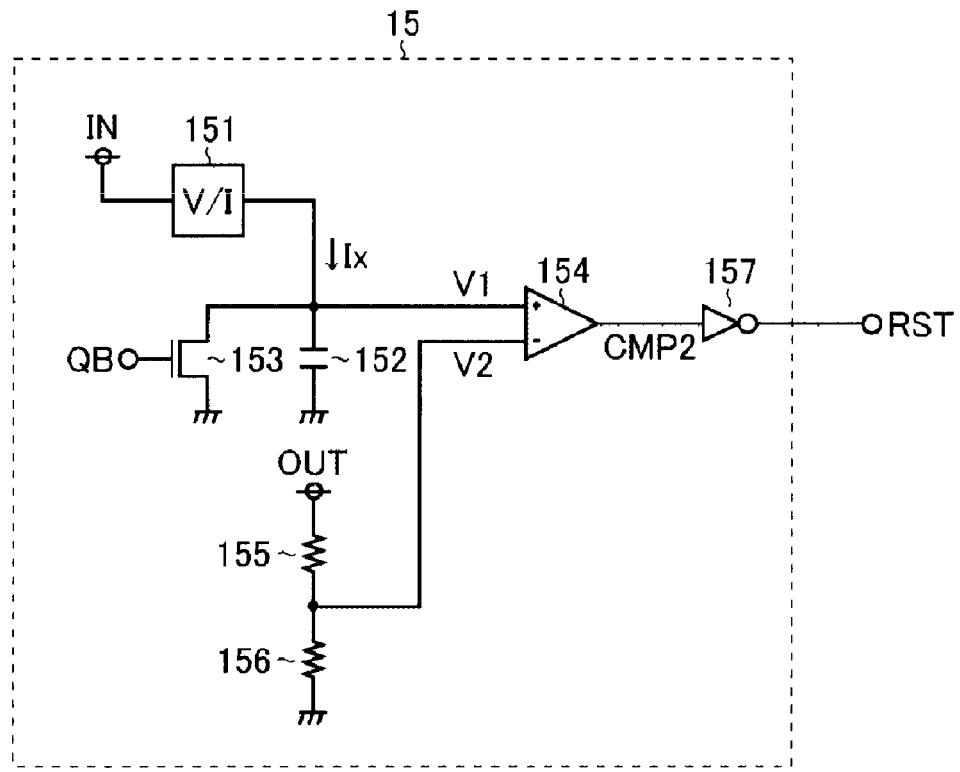
FIG. 9 is a circuit diagram showing a configuration example of an ON time setting unit shown in FIG. 1.
Figure 10:
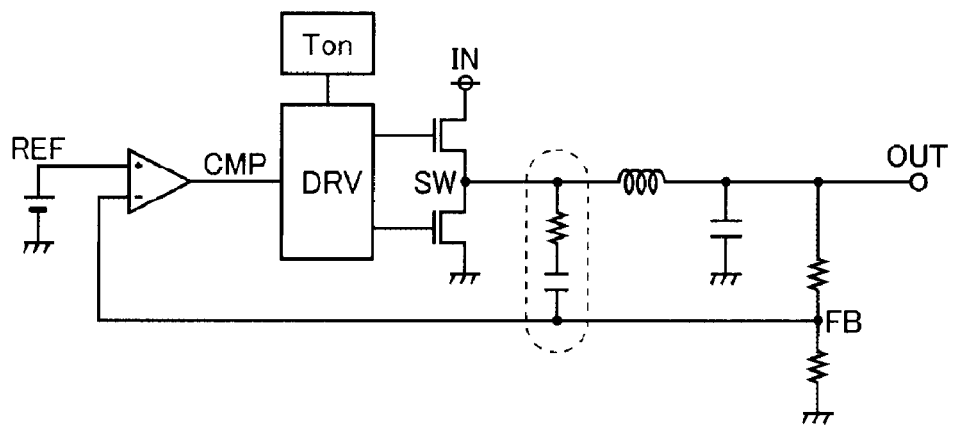
FIG. 10 is a circuit diagram showing an example of a conventional switching power supply apparatus employing a ripple injection technique.
Figure 11:
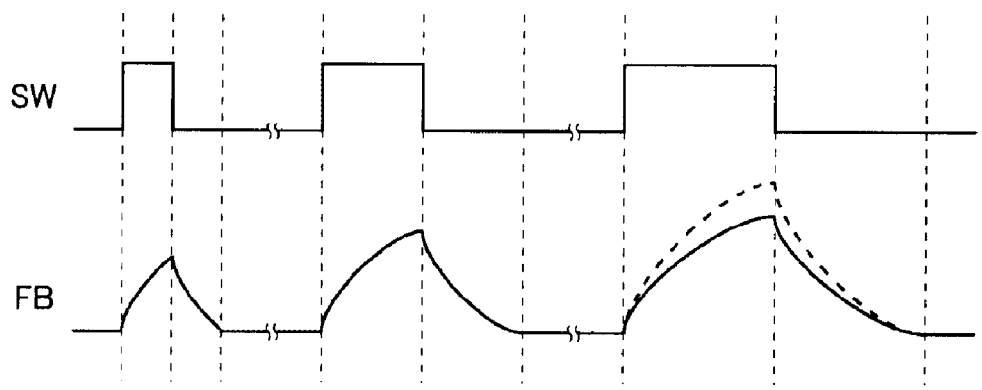
FIG. 11 is a timing diagram for illustrating first and second problems of the conventional switching power supply apparatus.
Figure 12:
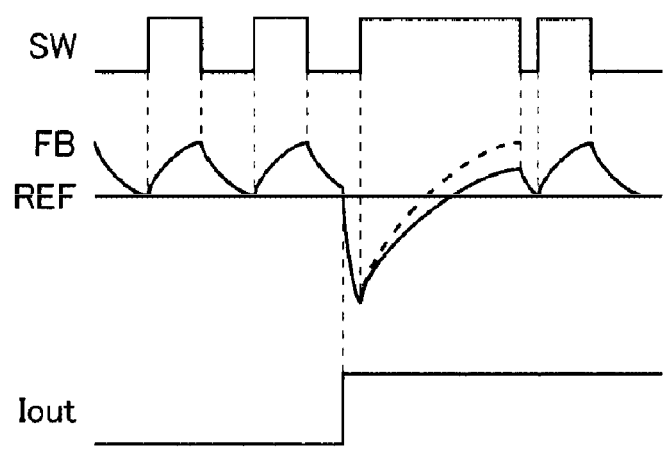
FIG. 12 is a timing diagram for illustrating a third problem of the conventional switching power supply apparatus.

FIG. 9 is a circuit diagram showing a configuration example of the ON time setting unit 15. The ON time setting unit 15 includes a voltage/current converter 151, a capacitor 152, an N-channel type MOS field effect transistor (MOSFET) 153, a comparator 154, resistors 155 and 156 and an inverter 157.

The voltage/current converter 151 performs voltage/current conversion upon the input voltage IN to generate a charge current Ix (which is proportional to the input voltage IN). A current value of the charge current Ix varies depending on a voltage value of the input voltage IN. In more detail, as the input voltage IN increases, the charge current Ix becomes larger, and as the input voltage IN decreases, the charge current Ix becomes smaller.

A first end of the capacitor 152 is connected to the voltage/current converter 151. A second end of the capacitor 152 is connected to the ground terminal. When the transistor 153 is turned off, the capacitor 152 is charged by the charge current Ix and a triangular wave voltage V1, which appears at the first end of the capacitor 152, increases. On the other hand, when the transistor 153 is turned on, the capacitor 152 is discharged through the transistor 153 and the triangular wave voltage V1 decreases.

The transistor 153 is a charging/discharging switch which switches between charging and discharging of the capacitor 152 based on the inverted output signal QB of the D flip-flop (and an ON/OFF control of the transistors 11 and 12). A drain of the transistor 153 is connected to the first end of the capacitor 152 and source of the transistor 153 is connected to the ground terminal. Further, a gate of the transistor 153 is connected to the input end of the inverted output signal QB.

The voltage/current converter 151, the capacitor 152 and the transistor 153 constitute a triangular wave voltage generating circuit which generates the triangular wave voltage V1 based on the input voltage IN.

The comparator 154 compares the triangular wave voltage V1 input to a non-inverted input terminal (+) with a division output voltage V2 input to an inverted input terminal (−) to generate a comparison voltage CMP2. If the triangular wave voltage V1 is higher than the division output voltage V2, the comparison signal CMP2 has a high level. On the other hand, if the triangular wave voltage V1 is lower than the division output voltage V2, the comparison signal CMP2 has a low level.

A first end of the resistor 155 is connected to the input end of the output voltage OUT. A second end of the resistor 155 is connected to a first end of the resistor 156. A second end of the resistor 156 is connected to the ground terminal. The resistors 155 and 156 constitute a division output voltage generating circuit, which divides the output voltage OUT to output the division output voltage V2 from a connection node between the resistors 155 and 156.

The inverter 157 inverts a logic level of the comparison signal CMP2 to generate a reset signal RST.

Next, an operation of the ON time setting unit 15 as configured above will be described in detail with reference to FIG. 2.

During the OFF period of the transistor 11, if the feedback voltage FB is decreased to the ripple reference voltage REF2, the comparison signal CMP rises to a high level and the output signal Q of the D flip-flop 14 turns to a high level (the inverted output signal QB turns to a low level). Accordingly, the transistor 11 is turned on and the feedback voltage FB rises. At this time, the transistor 153 is turned off according to the low level transition of the inverted output signal QB, the capacitor 152 begins to be charged by the charge current Ix. As described previously, the charge current Ix varies depending on the input voltage IN. Accordingly, the triangular wave voltage V1 is increased with a gradient (slope) based on the input voltage IN.

Thereafter, if the triangular wave voltage V1 rises to the division output voltage V2 (the division voltage of the output voltage OUT), the reset signal RST falls to a low level and the output signal Q of the D flip-flop 14 also falls to a low level (i.e., the inverted output signal QB rises to a high level). Accordingly, the transistor 11 is turned off and the feedback voltage FB falls again. At this time, the transistor 153 is turned on according to the high level transition of the inverted output signal QB. Accordingly, the capacitor 152 is rapidly discharged through the transistor 153 and the triangular wave voltage V1 falls to a low level.

The driver 13 generates gate signals G1 and G2 based on the inverted output signal QB and performs an ON/OFF control of the transistors 11 and 12 using the gate signals G1 and G2. As a result, a square wave-shaped switch voltage SW is output from the external terminal T2. The switch voltage SW is smoothed by the inductor L1 and the capacitor C1 to generate the output voltage OUT. The output voltage OUT is divided by the resistors R1 and R2 to generate the feedback voltage FB. With this output feedback control, the switching power supply apparatus 1 can generate a desired output voltage OUT from the input voltage IN very simply.

In addition, the ON time setting unit 15 sets the ON time Ton to a variable value depending on the input voltage IN and the output voltage OUT, rather than a fixed value. In more detail, the ON time setting unit 15 may shorten the ON time Ton by increasing a gradient (slope) of the triangular wave voltage V1 with an increase of the input voltage IN, while lengthening the ON time Ton by decreasing a gradient (slope) of the triangular wave voltage V1 with a decrease of the input voltage IN. In addition, the ON time setting unit 15 may shorten the ON time Ton by decreasing the division output voltage V2 with a decrease of the output voltage OUT, while lengthening the ON time Ton by increasing the division output voltage V2 with an increase of the output voltage OUT.

This configuration can prevent a variation of a switching frequency without damaging the merit of the non-linear control. This facilitates improvement in the precision of the output voltage and characteristics of load regulation, and electromagnetic interference (EMI) and noise suppression in device designs. In addition, it is possible to use the switching power supply apparatus 1 as a power supply means for an application having a large input voltage variation or an application requiring various output voltages.

<Modifications>

Although application of the present disclosure to the switching power supply apparatus of a synchronous rectification type has been illustrated in the above embodiments, the present disclosure is not limited thereto, and may be applied to a switching power supply apparatus employing other switching controls including non-synchronous rectification manners.

<Industrial Applicability>

The switching power supply apparatus of the present disclosure can be used as a power supply for various kinds of electronics, including a power supply for a notebook PC, a power supply for portable device, a power supply for a server, a power supply (IC), a power supply for a HDD, etc.

Figure 13:
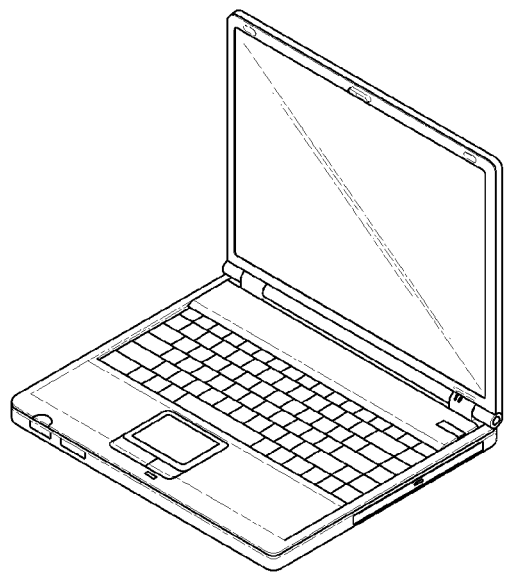
FIG. 13 shows a laptop computer using the switching power supply apparatus of the present disclosure as a power supply.

FIG. 13 shows a laptop computer 200 using the switching power supply apparatus of the present disclosure as a power supply.

According to the present disclosure in some embodiments, the switching power supply apparatus can provide a stable switching control using a ripple injection.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. For example, an exchange between bipolar transistors and MOS field effect transistors and logic level inversion of various signals are optional. In other words, the disclosed embodiments are to be construed to be not limited, but illustrative. The accompanying claims and their equivalents are intended to cover such forms or modifications as would fall within the scope and spirit of the disclosures.

What is claimed is:

1. A switching power supply apparatus, comprising:
an output transistor configured to generate an output voltage from an input voltage based on an ON/OFF control of the output transistor;
a reference voltage generating unit configured to generate a reference voltage;
a ripple injection unit configured to inject a ripple component into the reference voltage to generate a ripple reference voltage;
a comparator configured to compare a feedback voltage based on the output voltage with the ripple reference voltage to generate a comparison signal; and
a switching controller configured to perform the ON/OFF control of the output transistor based on the comparison signal,
wherein the ripple injection unit includes:
a charging/discharging portion configured to generate a charge/discharge current based on the ON/OFF control of the output transistor;
a capacitor which is charged/discharged by the charge/discharge current; and a gm amplifier configured to bias one end of the capacitor by using the reference voltage, and wherein the ripple reference voltage is output from the one end of the capacitor.

2. The switching power supply apparatus of claim 1, wherein the gm amplifier is configured to be irresponsive to a variation of an output having a period shorter than an ON period of the output transistor.

3. The switching power supply apparatus of claim 1, wherein the ripple injection unit further includes an error amplifier configured to amplify a difference between the reference voltage and the feedback voltage to generate an error voltage, and wherein the gm amplifier is configured to bias the one end of the capacitor using the error voltage.

4. The switching power supply apparatus of claim 1, wherein the charging/discharging portion includes:
   a first current source configured to generate a first current based on the output voltage;
   a second current source configured to generate a second current based on the input voltage, the second current being larger than the first current; and
   a switch configured to open/close a current path of the second current based on the ON/OFF control of the output transistor, and
   wherein the switch is off during a charging period of the capacitor such that the first current flows into the capacitor, and the switch is on during a discharging period of the capacitor such that a differential current between the first current and the second current flows out of the capacitor.

5. The switching power supply apparatus of claim 1, wherein the switching controller includes:
   a D flip-flop having a clock input terminal to which the comparison signal is input;
   a driver configured to perform the ON/OFF control of the output transistor based on an output signal of the D flip-flop; and
   an ON time setting unit configured to generate a reset signal of the D flip-flop to set an ON time of the output transistor.

6. The switching power supply apparatus of claim 5, wherein the ON time setting unit shortens the ON time of the output transistor with an increase of the input voltage, while lengthening the ON time of the output transistor with a decrease of the input voltage.

7. The switching power supply apparatus of claim 5, wherein the ON time setting unit shortens the ON time of the output transistor with a decrease of the output voltage, while lengthening the ON time of the output transistor with an increase of the output voltage.

8. The switching power supply apparatus of claim 5, wherein the ON time setting unit includes:
   a triangular wave voltage generating circuit configured to generate a triangular wave voltage based on the input voltage;
   a division output voltage generating circuit configured to generate a division output voltage based on the output voltage; and
   a second comparator configured to compare the triangular wave voltage with the division output voltage to generate the reset signal.

9. The switching power supply apparatus of claim 8, wherein the triangular wave voltage generating circuit includes:
   a voltage/current converting portion configured to generate a charge current based on the input voltage;
   a second capacitor connected to the voltage/current converting portion; and
   a second switch configured to perform switching between charging and discharging of the second capacitor based on the ON/OFF control of the output transistor.

10. A laptop computer, comprising the switching power supply apparatus of claim 1 as a power supply.

* * * * *